United States Patent
Lee et al.

(10) Patent No.: US 8,140,008 B2
(45) Date of Patent: Mar. 20, 2012

(54) SERVICE RELAY DEVICE, SERVICE RECEIVER FOR RECEIVING THE RELAYED SERVICE SIGNAL, AND METHODS THEREOF

(75) Inventors: June-hee Lee, Seongnam-si (KR); Kyo-shin Choo, Yongin-si (KR); Kil-sik Ha, Anyang-si (KR); Hae-joo Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 711 days.

(21) Appl. No.: 12/236,865

(22) Filed: Sep. 24, 2008

(65) Prior Publication Data

US 2009/0197527 A1    Aug. 6, 2009

(30) Foreign Application Priority Data

Feb. 1, 2008 (KR) ........................ 10-2008-0010741

(51) Int. Cl.
*H04Q 7/32* (2006.01)
(52) U.S. Cl. ............... 455/20; 455/7; 455/11.1; 455/24; 455/426.1; 455/422.1; 370/315; 370/310; 370/328; 370/329
(58) Field of Classification Search ............ 455/7, 11.1, 455/24, 20, 21, 23, 412, 412.1, 422.1, 403, 455/550.1, 445, 426.1, 426.2; 370/315, 310, 370/328, 329
See application file for complete search history.

(56) References Cited

U.S. PATENT DOCUMENTS

| | | | |
|---|---|---|---|
| 6,373,833 B1 * | 4/2002 | Suonvieri et al. | 370/347 |
| 7,715,787 B2 * | 5/2010 | Yoon et al. | 455/13.1 |
| 7,778,596 B2 * | 8/2010 | Anderson et al. | 455/11.1 |

FOREIGN PATENT DOCUMENTS

| | | |
|---|---|---|
| JP | 2006101304 A | 4/2006 |
| KR | 1020020024899 A | 4/2002 |
| KR | 10-2003-0097319 A | 12/2003 |
| KR | 10-2006-0058352 A | 5/2006 |
| KR | 1020070067787 A | 6/2007 |
| WO | 2007/067885 A2 | 6/2007 |

* cited by examiner

*Primary Examiner* — Keith Ferguson
(74) *Attorney, Agent, or Firm* — Sughrue Mion, PLLC

(57) ABSTRACT

A service relay device is provided. The service relay device includes a receiving unit which receives a service signal, and a service processing unit which changes information regarding an order of changing frequency channels included in the received service signal, using replacement frequency channels, and broadcasts the service signal. The service processing unit includes a detecting unit which detects the information regarding the order of changing frequency channels, a storage unit which stores information regarding replacement frequency channels, an information processing unit which replaces the information regarding the order of changing frequency channels, using the replacement frequency channels stored in the storage unit, and a relay unit which broadcasts a service signal. As a result, service signals are provided stably even in the fringe area.

21 Claims, 4 Drawing Sheets

SERVICE RELAY DEVICE, SERVICE RECEIVER FOR RECEIVING THE RELAYED SERVICE SIGNAL, AND METHODS THEREOF

CROSS-REFERENCE TO RELATED APPLICATION

This application claims priority from Korean Patent Application No. 2008-0010741, filed Feb. 1, 2008, in the Korean Intellectual Property Office, the entire disclosure of which is hereby incorporated by reference.

BACKGROUND OF THE INVENTION

1. Field of the Invention

Devices and methods consistent with the present invention relate to a service relay device, a service receiver receiving the relayed service signal, and methods thereof, and more particularly, to a service relay device which relays the service signal from a plurality of subsequent frequency channels, a service receiver which receives the relayed service signal, and methods thereof.

2. Description of the Related Art

The rapid development in the field of digital broadcast has made a variety of services available through broadcast receivers. The broadcast service is transmitted from a broadcast station or relayed from a relay device, to be received in the receivers of viewers. However, the problem is that not all viewers receive the service under the same conditions. Specifically, some viewers may be in a fringe area where the reception is poor due to ambient obstacles, such as high-rise buildings, mountains, or the like. The service relay devices are thus provided to enable smooth reception of the signals in the fringe areas.

FIG. 1 illustrates the structure of a related art service network with which a service relay device is provided. Referring to FIG. 1, a base station 10 covers 'Region 1' which is a wide area and which includes 'Region 2' which is a fringe area.

The service network thus includes a service relay device 20 to manage signal transfer to the fringe area. Accordingly, the service relay device 20 broadcasts a service signal transmitted from the base station 10 to Region 2 via a different frequency channel.

FIG. 2 illustrates the characteristics of a frequency channel in Region 1 and Region 2. If the base station 10 uses an A1 frequency channel which has a mean frequency 'A1', the service relay device 20 uses a B1 frequency channel. The different frequency channels are used even to transfer the same service, in order to avoid interferences due to differences in the paths, or the like.

In the developing digital broadcast technology, it has been suggested to transfer one single service through a variety of different frequency channels. Generally, the data size differs depending on the service types. Accordingly, if a broadcast station uses only one unique frequency channel allocated thereto, the station will have difficulty of transferring a large volume of data within a predetermined time. In order to address this problem, the method of frequency channel exchange among the broadcast stations has been proposed.

In the above method, a receiver, such as a TV, has to know the information about a new frequency channel if the frequency channel is exchanged. Accordingly, the broadcast station adds the information about a new frequency channel to a service signal and transfers the service signal along with the information.

Meanwhile, the service relay 20 covering the fringe area as shown in FIG. 1 receives a service signal and broadcasts the received signal through a different frequency channel. If the frequency channel is exchanged, the service relay device 20 is unable to relay the service signals received from a plurality of subsequent frequency channels. As a result, the fringe area does not have a good signal reception.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a service relay device capable of changing an order of the frequency channels to be changed using replacement frequency channel information, and relaying services from a plurality of frequency channels stably, a service receiver receiving the relayed service signals, and methods thereof.

According to an aspect of the present invention, there is provided a service relay device, including a receiving unit which receives a service signal which is transmitted using a plurality of frequency channels in sequence, and a service processing unit which changes information regarding an order of changing frequency channels written in the received service signal, using replacement frequency channels, and broadcasts the service signal.

The service processing unit may include a detecting unit which detects the information regarding the order of changing frequency channels by demodulating the service signal, a storage unit which stores information regarding replacement frequency channels corresponding to the plurality of frequency channels, an information processing unit which replaces the information regarding the order of changing frequency channels, using the replacement frequency channels stored in the storage unit, and a relay unit which broadcasts a service signal in which the information regarding the order of changing the replacement frequency channels is written.

The information regarding the order of changing frequency channels may include information regarding a next frequency channel to be used to support the same service as the current frequency channel.

The information regarding the order of changing frequency channels may include information indicating an order of the entire frequency channels which support the same service in sequence.

According to an aspect of the present invention, there is also provided a method of relaying a service signal in a service relay device, including receiving a service signal which is transmitted using a plurality of frequency channels in sequence, and changing information regarding an order of changing frequency channels written in the received service signal, using replacement frequency channels, and broadcasting the service signal.

The changing may include detecting the information regarding the order of changing frequency channels by demodulating the service signal, reading a replacement frequency channel from a storage unit which stores information regarding replacement frequency channels corresponding to the plurality of frequency channels, and replacing the information regarding the order of changing frequency channels, using the replacement frequency channels read from the storage unit, and broadcasting a service signal in which the information regarding the order of changing the replacement frequency channels is written.

The information regarding the order of changing frequency channels may include information regarding a next frequency channel to be used to support the same service as the current frequency channel.

The information regarding the order of changing frequency channels may include information indicating an order of the entire frequency channels which support the same service in sequence.

According to an aspect of the present invention, there is also provided a service receiver including a service receiving unit which receives a service signal transmitted from a broadcast station and relayed from a service relay device, using a plurality of frequency channels in sequence, and a service providing unit which detects, from the relayed service signal, changed information regarding an order of changing frequency channels based on replacement frequency channels, selects a next frequency channel according to the detected information, and provides the service signal in succession.

The detected information regarding the order of changing frequency channels is information regarding a replacement frequency channel corresponding to a frequency channel to support the same service as the currently used frequency channel next to the currently used frequency channel.

The detected information regarding the order of changing frequency channels is information indicating an order of the entire replacement frequency channels corresponding to the order of the entire frequency channels used to support the same service in sequence.

According to an aspect of the present invention, there is also provided a method of receiving a service signal, including receiving a service signal transmitted from a broadcast station and relayed from a service relay device, using a plurality of frequency channels in sequence, and detecting, from the relayed service signal, changed information regarding an order of changing frequency channels based on replacement frequency channels, and selecting a next frequency channel according to the detected information, and providing the service signal in succession.

The detected information regarding the order of changing frequency channels is information regarding a replacement frequency channel corresponding to a frequency channel to support the same service as the currently used frequency channel next to the currently used frequency channel.

The detected information regarding the order of changing frequency channels is information indicating an order of the entire replacement frequency channels corresponding to the order of the entire frequency channels used to support the same service in sequence.

According to an aspect of the present invention, there is also provided a service relay device, comprising: a receiving unit which receives a service signal, a detecting unit which detects information regarding the order of changing frequency channels by demodulating the service signal, an information processing unit which replaces the information regarding the order of changing frequency channels, using the replacement frequency channels stored in a storage unit and a relay unit which broadcasts the service signal in which the information regarding the order of changing the replacement frequency channels is included.

The information regarding the order of changing frequency channels may comprise information regarding a next frequency channel to be used to support the same service as the current frequency channel.

The information regarding the order of changing frequency channels may comprise information indicating an order of the entire frequency channels which support the same service in sequence.

BRIEF DESCRIPTION OF THE DRAWINGS

The above and other aspects of the present invention will be more apparent from the following detailed description of exemplary embodiments with reference to the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
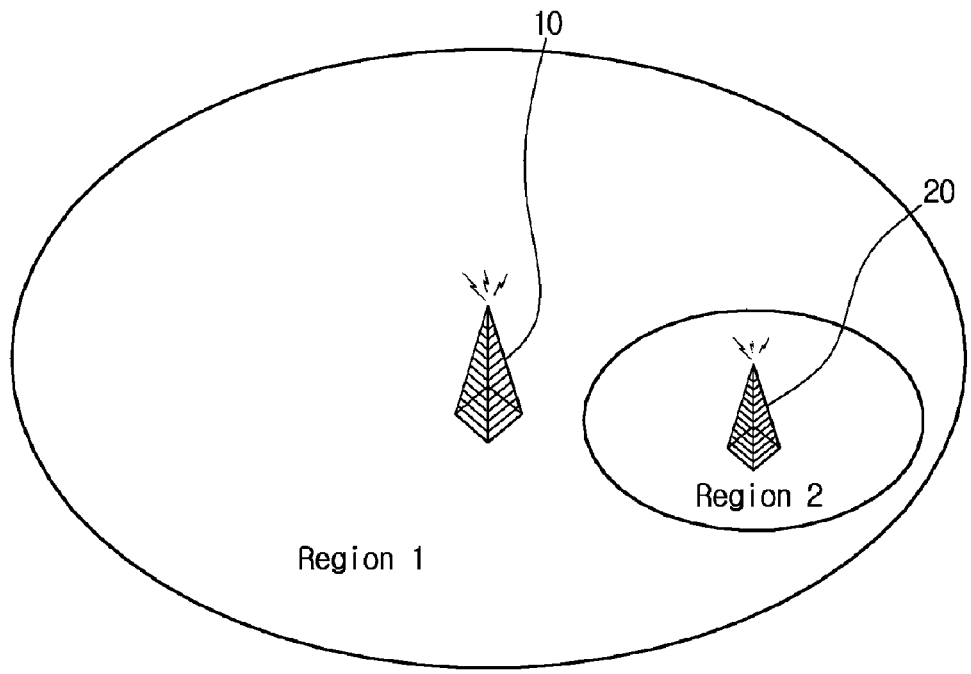
FIG. 1 illustrates the structure of a related art service network.
Figure 2:
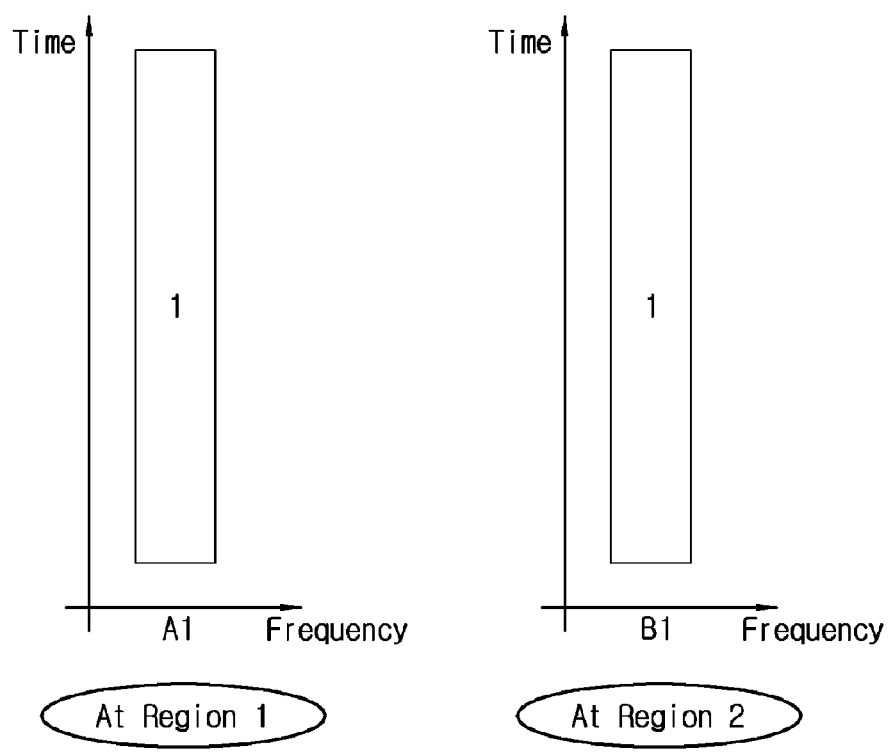
FIG. 2 illustrates a change of frequency channel in a fringe area where the reception is poor in a related art network.
Figure 3:
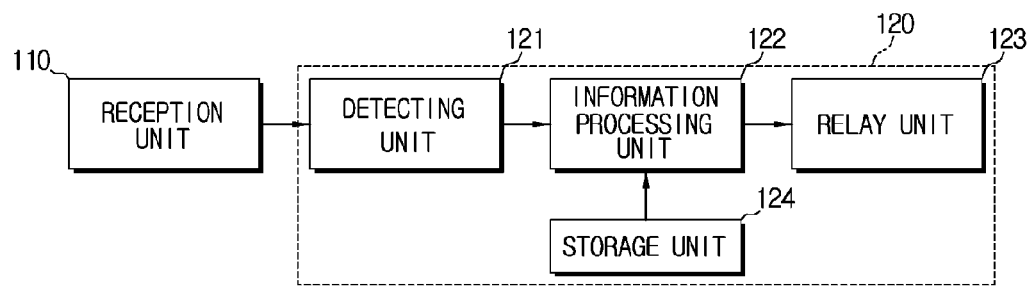
FIG. 3 is a block diagram of a service relay device according to an exemplary embodiment of the present invention.

FIG. 3 is a block diagram of a service relay device according to an exemplary embodiment of the present invention. Referring to FIG. 3, the service relay device includes a reception unit 110 and a service processing unit 120.

The reception unit 110 is capable of receiving a service from a broadcasting base station (not illustrated) which covers the area where the service relay device is located. The reception unit 110 may receive a variety of broadcast services such as a general broadcast service, or a text broadcast service. The service may be transmitted using a plurality of frequency channels.

Figure 4:
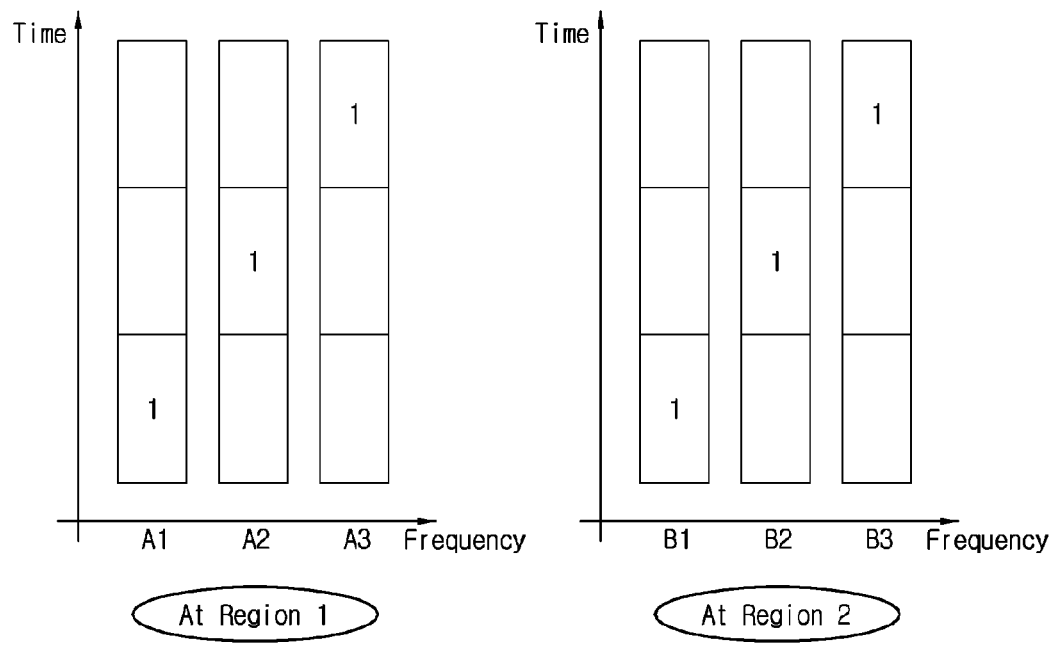
FIG. 4 illustrates an example of a service relayed by the service relay device according to an exemplary embodiment of the present invention.

FIG. 4 illustrates an example of service transmitted using a plurality of frequency channels. Referring to FIG. 4, 'service 1' is provided throughout the 'region 1' covered by the broadcast base station, in a manner in which 'service 1' is transmitted over A1 frequency channel in an initial stage, and then transmitted over A2 and A3 frequency channels as time passes.

When the reception unit 110 receives the abovementioned type of service, the service processing unit 120 of the service relay device detects, from the received service signal, the information regarding the order of changing frequency channels, changes the order of changing frequency channels based on an order of changing replacement frequency channels, and broadcasts the result. In an exemplary embodiment, the information regarding the order of changing frequency channels may correspond to a first information. Moreover, the changed information based on an order of changing replacement frequency channels may correspond to a second information.

Referring to FIG. 3, the service processing unit 120 may include a detecting unit 121, an information processing unit 122, a relay unit 123, and a storage unit 124.

The detecting unit 121 operates to detect the information regarding the order of changing frequency channels, by demodulating the received service signal.

The 'information regarding the order of changing frequency channels' refers to information about the order according to which the entire frequency channels to transfer one single service are changed. For example, the information regarding the order of changing frequency channels may be 'A1->A2->A3' as illustrated in FIG. 4.

The information regarding the order of changing frequency channels may be implemented as the information regarding the next frequency channel that follows the frequency channel that is currently providing a service. For example, if the frequency channel 'A1' is currently used, the frequency channel 'A2' may be included in the service signal as the information regarding the order of changing frequency channels.

If the information regarding the order of changing frequency channels is detected, the information processing unit 122 changes the information regarding the order of changing frequency channels included in the service signal, using the information regarding the order of changing replacement frequency channels. The 'replacement frequency channels' refer to frequency channels to be used to transfer service signal in lieu of the original frequency channels in the fringe area where the reception is poor.

The storage unit 124 stores the frequency channels of 'Region 2' matching the frequency channels of 'Region 1' as the replacement frequency channels. The replacement frequency channels may be adequately designated by a designer of the service relay device, in consideration of the frequency channels used in the surrounding areas.

The information processing unit 122 may include the order of changing replacement frequency channels in the service signal, based on the information regarding the order of changing replacement frequency channels stored in the storage unit 124.

Referring to FIG. 4, frequency channel 'A1' matches 'B1', 'A2' matches 'B2', and 'A3' matches 'B3'. In other words, the replacement frequency channels are 'B1, B2 and B3'.

Accordingly, if the order of changing frequency channels is included in the service signal, the information regarding the order of changing replacement frequency channels is: 'B1->B2->B3'. If only the information regarding the next frequency channel is included in the service signal, the information regarding the order of changing replacement frequency channels is: 'B1', 'B2', or 'B'.

When the information processing unit 122 completes changing the information regarding the order of changing frequency channels, the relay unit 123 broadcasts the service signal, including the changed information regarding the order of changing frequency channels, throughout 'Region 2'.

In other words, the broadcast receivers located in the fringe area are able to receive a service signal using the information regarding the order of changing replacement frequency channels, which is, 'B1, B2, and B3'.

Figure 5:
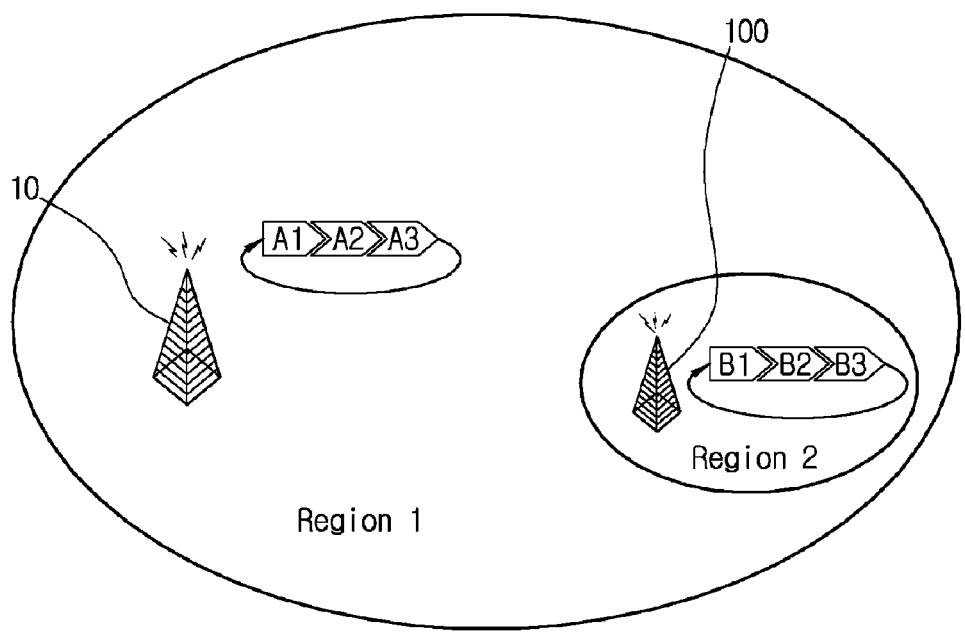
FIG. 5 illustrates the structure of a service network including a service relay device according to an exemplary embodiment of the present invention.

FIG. 5 illustrates the structure of a service network using the service relay device according to an exemplary embodiment of the present invention. Referring to FIG. 5, the broadcast base station 10, covering 'Region 1', provides the service using the frequency channels in the order of A1->A2->A3.

Accordingly, the service relay device 100, provided for the fringe area, provides service using the replacement frequency channels B1, B2 and B3 which match the frequency channels A1, A2 and A3.

The service relay device 100 illustrated in FIG. 5 may be implemented using the structure illustrated in FIG. 3.

Figure 6:
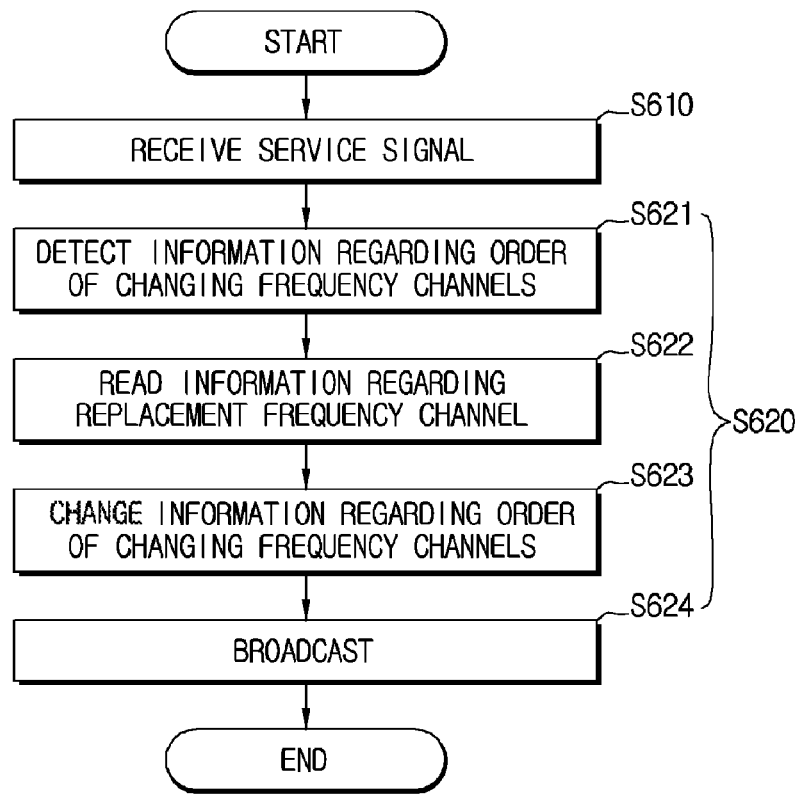
FIG. 6 is a flowchart illustrating a method for relaying a service according to an exemplary embodiment of the present invention.

FIG. 6 is a flowchart illustrating a method for relaying a service signal according to an exemplary embodiment of the present invention.

In operation S610, a service signal is received. In operation S620, the service signal in operation S610 is broadcast using a replacement frequency channel.

In operation S621, the information regarding the order of changing frequency channels is detected from the service.

If the information regarding the order of changing frequency channels is detected, in operation S622, the information regarding the order of changing replacement frequency channels corresponding to the detected information regarding the order of changing frequency channels, is read from the storage unit 124 of the service relay device 100.

In operation S623, the information regarding the order of changing frequency channels, included in the service signal, is changed using the read information regarding the order of changing replacement frequency channels.

When the change is completed, in operation S624, the service containing the information regarding the order of changing replacement frequency channels is broadcast. As a result, the receivers within the corresponding region can receive the service using the replacement frequency channels in sequence according to the information regarding the order of changing replacement frequency channels.

Figure 7:
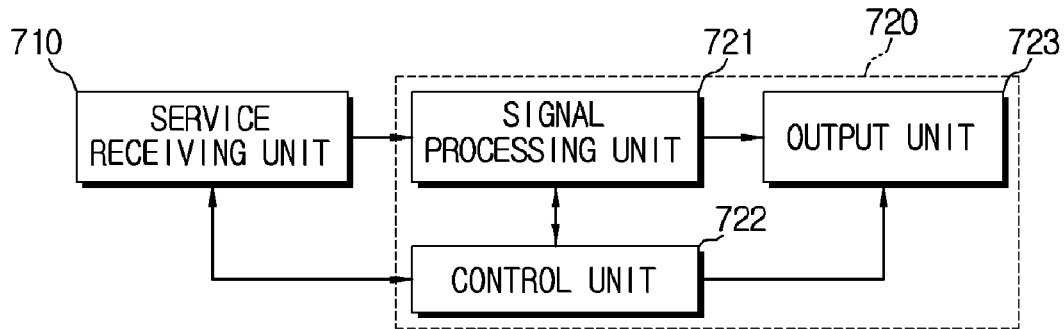
FIG. 7 is a block diagram of a service receiver according to an exemplary embodiment of the present invention.

FIG. 7 is a block diagram of a service receiver according to an exemplary embodiment of the present invention. Referring to FIG. 7, the service receiver may include a service receiving unit 710 and a service providing unit 720. The service receiving unit 710 may receive the service relayed from the service relay device. The service is transmitted from the broadcast station using a plurality of frequency channels in sequence, and may include a broadcast service, and other forms of data services. In this state, the original frequency channel is replaced by the replacement frequency channels.

The service providing unit 720 detects, from the relayed service signal, the information regarding the order of changing replacement frequency channels corresponding to the initial order of changing frequency channels, and provides the service in succession by selecting in sequence the frequency channels to be used next, according to the detected information.

In order to carry out the abovementioned operations, the service providing unit 720 may include a signal processing unit 721, a control unit 722 and an output unit 723.

The signal processing unit 721 demodulates a service signal received at the service receiving unit 710, and detects the information regarding the order of changing replacement frequency channels. The detected information is provided to the control unit 722.

Additionally, the signal processing unit 721 provides the output unit 723 with the demodulated service signal, so that the output unit 723 can output a variety of services such as text broadcast service, broadcast service, or data broadcast service.

The output unit 723 may include a display unit to output video, and a speaker to output sound.

The control unit 722 checks the information regarding the next frequency channel following the currently used frequency channel, using the detected information regarding the order of changing replacement frequency channels. Accordingly, the control unit 722 controls the service receiving unit 710 to tune to the next frequency channel, when the service transfer through the current frequency channel is finished. As a result, service is provided through the next frequency channel.

Figure 8:
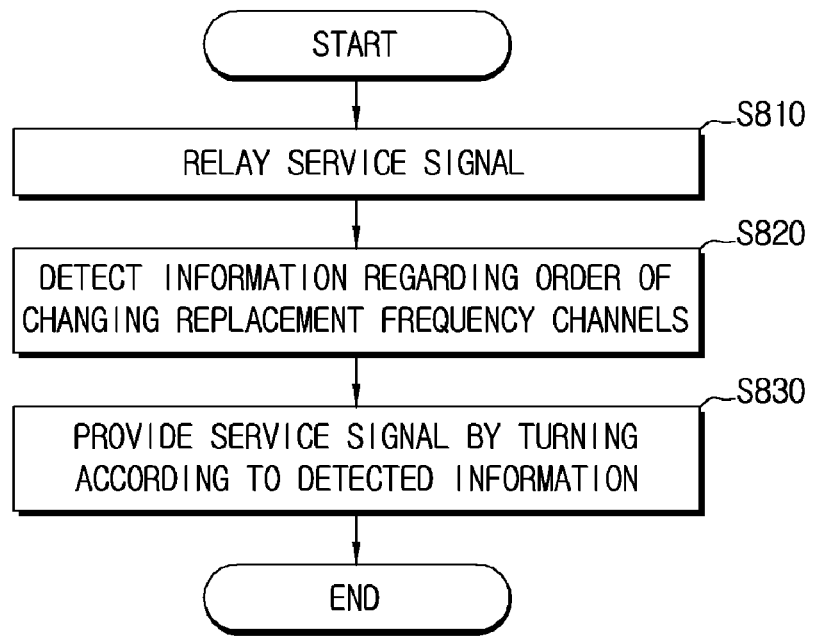
FIG. 8 is a flowchart illustrating a method of receiving a service according to an exemplary embodiment of the present invention.

FIG. 8 is a flowchart illustrating a method of a service receiver for receiving a service signal according to an exemplary embodiment of the present invention.

In operation S810, if a service signal is relayed via the service relay device 100, in operation S820, the relayed service signal is demodulated so that the information regarding the order of changing replacement frequency channels is detected.

In operation S830, the frequency channels are tuned in turn based on the detected information so that the service is provided.

The 'detected information' may be the order of changing the entire frequency channels, or alternatively, may be only one frequency channel to be used next.

According to the exemplary embodiments of the present invention, the service signals, which are transmitted through a plurality of subsequent frequency channels, may be relayed and received stably in a fringe area where the reception would otherwise be poor. The service receivers can receive the relayed service signals and provide the corresponding service to the users. As a result, all the viewers, whether they are in a general area or a fringe area, can receive a variety of services stably.

While certain exemplary embodiments of the present invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A service relay device, comprising:
    a receiving unit which receives a service signal which is transmitted using a plurality of frequency channels in sequence; and
    a service processing unit which changes a first information regarding an order of changing frequency channels, included in the received service signal, using replacement frequency channels to generate a second information, and broadcasts the service signal including the second information,
    wherein the service processing unit comprises:
    a storage unit which stores information regarding replacement frequency channels corresponding to the plurality of frequency channels; and
    an information processing unit which replaces the first information regarding the order of changing frequency channels, using the replacement frequency channels stored in the storage unit.

2. The service relay device of claim 1, wherein the service processing unit comprises:
    a detecting unit which detects the first information regarding the order of changing frequency channels by demodulating the service signal;
    a relay unit which broadcasts the service signal including the second information.

3. The service relay device of claim 1, wherein the first information comprises information regarding a next frequency channel to be used to support the same service as the current frequency channel.

4. The service relay device of claim 1, wherein the first information comprises information indicating an order of the entire frequency channels which support the same service in sequence.

5. The service relay device of claim 1, wherein the first information comprises information regarding a next frequency channel to be used to support the same service as the current frequency channel.

6. The service relay device of claim 1, wherein the first information comprises information indicating an order of the entire frequency channels which support the same service in sequence.

7. The service relay device of claim 1, wherein the service processing unit comprises:
    a storage unit which stores information regarding replacement frequency channels corresponding to the plurality of frequency channels.

8. The service relay device of claim 7, wherein the service processing unit further comprises:
    an information processing unit which replaces the first information regarding the order of changing frequency channels, using the replacement frequency channels stored in the storage unit.

9. A method of relaying a service signal in a service relay device, comprising:
    receiving a service signal which is transmitted using a plurality of frequency channels in sequence; and
    changing a first information regarding an order of changing frequency channels included in the received service signal, using replacement frequency channels to generate a second information, and broadcasting the service signal including the second information,
    the changing comprises:
    reading a replacement frequency channel from a storage unit which stores information regarding replacement frequency channels corresponding to the plurality of frequency channels; and
    replacing the first information using the replacement frequency channels read from the storage unit.

10. The method of claim 9, wherein the changing comprises:
    detecting the first information by demodulating the service signal;
    broadcasting the service signal including the second information.

11. The method of claim 9, wherein the first information comprises information regarding a next frequency channel to be used to support the same service as the current frequency channel.

12. The method of claim 9, wherein the first information comprises information indicating an order of the entire frequency channels which support the same service in sequence.

13. The method of claim 9, wherein the changing comprises:
    reading a replacement frequency channel from a storage unit which stores information regarding replacement frequency channels corresponding to the plurality of frequency channels.

14. The method of claim 13, wherein the changing further comprises:
    replacing the first information using the replacement frequency channels read from the storage unit.

15. A service receiver comprising:
a service receiving unit which receives a service signal transmitted from a broadcast station and relayed from a service relay device, using a plurality of frequency channels in sequence; and
a service providing unit which detects, from the relayed service signal, information regarding an order of changing frequency channels based on replacement frequency channels, selects a next frequency channel according to the detected information, and provides the service signal in succession,
wherein the a service relay device comprises:
a service processing unit which stores information regarding replacement frequency channels corresponding to the plurality of frequency channels and replaces the first information regarding the order of changing frequency channels, using the replacement frequency channels stored in the storage unit.

16. The service receiver of claim 15, wherein the detected information regarding the order of changing frequency channels comprises
information regarding a replacement frequency channel corresponding to a frequency channel to support the same service as the currently used frequency channel next to the currently used frequency channel.

17. The service receiver of claim 15, wherein the detected information regarding the order of changing frequency channels comprises information indicating an order of the entire replacement frequency channels corresponding to the order of the entire frequency channels used to support the same service in sequence.

18. A method of receiving a service signal, comprising:
receiving a service signal transmitted from a broadcast station and relayed from a service relay device, using a plurality of frequency channels in sequence; and
detecting, from the relayed service signal, information regarding an order of changing frequency channels based on replacement frequency channels; and
selecting a next frequency channel according to the detected information, and providing the service signal in succession.

19. The method of claim 18, wherein the detected information regarding the order of changing frequency channels comprises information regarding a replacement frequency channel corresponding to a frequency
channel supporting the same service as the currently used frequency channel, next to the currently used frequency channel.

20. The method of claim 18, wherein the detected information regarding the order of changing frequency channels comprises information indicating an order of the entire replacement frequency channels corresponding to the order of the entire frequency channels used to support the same service in sequence.

21. A service relay device, comprising:
a receiving unit which receives a service signal;
a detecting unit which detects first information regarding the order of changing frequency channels by demodulating the service signal;
an information processing unit which replaces the first information regarding the order of changing frequency channels to generate a second information, using the replacement frequency channels stored in a storage unit; and
a relay unit which broadcasts the service signal including the second information.

* * * * *